(12) United States Patent
Bauer et al.

(10) Patent No.: US 11,125,370 B2
(45) Date of Patent: Sep. 21, 2021

(54) CONNECTOR FOR A FLUID LINE

(71) Applicant: NORMA Germany GmbH, Maintal (DE)

(72) Inventors: Andreas Bauer, Obernburg (DE); René Schindler, Maintal (DE)

(73) Assignee: Norma Germany GmbH, Maintal (DE)

( * ) Notice: Subject to any disclaimer, the term of this patent is extended or adjusted under 35 U.S.C. 154(b) by 347 days.

(21) Appl. No.: 16/315,828

(22) PCT Filed: Jun. 29, 2017

(86) PCT No.: PCT/EP2017/066189
§ 371 (c)(1),
(2) Date: Jan. 7, 2019

(87) PCT Pub. No.: WO2018/007241
PCT Pub. Date: Jan. 11, 2018

(65) Prior Publication Data
US 2020/0182388 A1    Jun. 11, 2020

(30) Foreign Application Priority Data
Jul. 7, 2016   (DE) .......................... 102016112529.6

(51) Int. Cl.
*F16L 37/107*   (2006.01)
*F16L 37/113*   (2006.01)

(52) U.S. Cl.
CPC ........... *F16L 37/107* (2013.01); *F16L 37/113* (2013.01)

(58) Field of Classification Search
CPC ....... F16L 37/10; F16L 37/133; F16L 37/098; F16L 37/0982; F16L 37/0985; F16L 37/107
(Continued)

(56) References Cited

U.S. PATENT DOCUMENTS 5,607,190 A   3/1997   Exandier et al.
5,653,475 A   8/1997   Scheyhing et al.
(Continued)

FOREIGN PATENT DOCUMENTS

CN   104603513 A   5/2015
CN   104662280 A   5/2015
(Continued)

OTHER PUBLICATIONS

Japanese Office Action for Japanese Application No. 2019500447 dated Feb. 18, 2020 (5 pages).
(Continued)

*Primary Examiner* — David Bochna
(74) *Attorney, Agent, or Firm* — Reising Ethington, P.C.

(57) ABSTRACT

A connector for a fluid seal, having an annular housing with a first end and a second end and a rotating ring. The rotating ring is arranged at the second end and the rotating ring has at least one connecting element that is in engagement with at least one retaining geometry and with at least one guide geometry. The guide geometry allows the at least one connecting element to move in a radial direction when the rotating ring is rotated relative to the housing. The at least one connecting element is connected to the rotating ring by at least one radially elastic spring geometry.

13 Claims, 4 Drawing Sheets

(58) Field of Classification Search
USPC .................................... 285/314, 315, 316
See application file for complete search history.

(56) References Cited

U.S. PATENT DOCUMENTS

| | | | |
|---|---|---|---|
| 6,517,120 B1* | 2/2003 | Miyajima | F16L 37/0985 |
| | | | 285/305 |
| 7,566,079 B1 | 7/2009 | Callahan et al. | |
| 9,291,294 B2 | 3/2016 | Lehmann et al. | |
| 10,012,335 B2 | 7/2018 | Dude | |
| 10,119,504 B2 | 11/2018 | Kohler | |
| 2007/0120362 A1* | 5/2007 | Poder | F16L 37/133 |
| | | | 285/314 |
| 2015/0176740 A1 | 6/2015 | Ludwig | |
| 2019/0063654 A1* | 2/2019 | Unger | F16L 37/101 |

FOREIGN PATENT DOCUMENTS

| | | |
|---|---|---|
| CN | 104685282 A | 6/2015 |
| DE | 69514018 T2 | 8/2000 |
| DE | 102004012443 B3 | 11/2004 |
| DE | 102010035027 A1 | 2/2012 |
| DE | 102012007670 A1 | 10/2013 |
| DE | 102012106734 A1 | 2/2014 |
| EP | 2990708 A1 | 3/2016 |
| JP | S6289593 U | 6/1987 |
| JP | H04296291 A | 10/1992 |
| JP | H0842766 A | 2/1996 |
| JP | 2015537137 A | 12/2015 |
| WO | 2009082288 A1 | 7/2009 |
| WO | 2014056652 A1 | 4/2014 |

OTHER PUBLICATIONS

English Translation of Japanese Office Action for Japanese Application No. 2019500447 dated Feb. 18, 2020 (10 pages).
First German Office Action for Application No. 10 2016 112 529.6 dated May 5, 2017, 7 pages.
International Search Report for Application No. PCT/EP2017/066189 dated Sep. 12, 2017, 5 pages.
English Translation of the International Search Report for Application No. PCT/EP2017/066189 dated Sep. 12, 2017, 3 pages.
First Chinese Office Action for Chinese Patent Application No. 201780040273.0 dated Dec. 24, 2019, 7 pages.

* cited by examiner

CONNECTOR FOR A FLUID LINE

INTRODUCTION

The disclosure relates to a connector for a fluid line.

The connecting of pipes, hoses, connecting pieces or other fluid lines is necessary, for example, in the automobile industry, the utilities industry or in ventilation technology. Such connections have to meet requirements, for example with regard to their compressive strength, tightness, temperature resistance and/or mechanical stability. Said requirements can be important with regard to the installation, in particular when such connections are used for the connection of fuel tanks or in cooling water circuits of motor vehicles.

Connecting fluid lines such as hoses, pipes, connecting pieces and/or other elongated hollow bodies together in diverse ways is known. Thus, by means of a corresponding connector, a hose can be connectable to a pipe, a pipe to a connecting piece or, for example, a hose to a connecting piece.

A device for the tool-free connection of two elongated hollow bodies (referred to below as: tubes) is shown, for example, in WO 2009/082 288 A1. In this connection, a first connecting piece, to which a first tube is fastenable, is realized as a ring-shaped housing. Said first connecting piece comprises a socket geometry. A second connecting piece or a second tube is realized as a plug and comprises a plug geometry. The second connecting piece is insertable into the first connection piece axially along a central axis and is lockable and unlockable in a tool-free manner by means of the device. To this end, the device, according to the teaching in WO 2009/082 288 A1, comprises a rotating ring, a guide ring and an O-ring seal which are arranged side by side axially inside the housing. The O-ring seal, in this connection, is farthest away from the second connecting piece in the axial direction, whilst the rotating ring is arranged closest to the second connecting piece in the axial direction. The guide ring is arranged in the axial direction between the O-ring seal and the rotating ring, the O-ring seal being arranged in the axial direction between the first and the second connecting piece, which projects into the first connecting piece.

WO 2009/082 288 A1 discloses that the rotating ring, which is rotatable, comprises a closure geometry which is movable into engagement with the socket geometry of the first connecting piece and the plug geometry of the second connecting piece. In addition, it is shown by WO 2009/082 288 A1 that the guide ring comprises a guide geometry, by means of which part of the closure geometry of the rotating ring is movable out of engagement with the plug geometry. Said moving out of engagement is effected when the rotating ring is rotated against the guide ring, the connection between the first and the second connecting piece then being released.

A drawback of said design is that as a result of the design of the rotating ring, relatively high actuating forces are necessary in order to move the closure geometry of the rotating ring out of engagement with the plug geometry.

SUMMARY

It is an object of the disclosure, consequently, to eliminate the drawbacks of the prior art and to provide a device which is lockable and unlockable in a tool-free manner, requires low actuating forces and at the same time allows for a secure connection between the elements to be connected.

In the case of a connector according to the preamble of claim 1, it is provided according to the disclosure that a connecting element is connected to the rotating ring by means of at least one radially elastic spring geometry.

The design according to the disclosure is advantageous, in an embodiment, in that the radially elastic spring geometry enables a radial movement of the connection of the connecting element. As a result of the radially elastic spring geometry, the actuating forces are low in particular when multiple connecting elements are provided. This ensures that an operator is able to unlock the connector using one hand.

In an embodiment, the housing and the rotating ring are produced from plastics material. This can be advantageous as the housing and the rotating ring can thus each be produced in one piece, for example by means of injection molding. As an alternative to this, the rotating ring and the housing can also be produced from other materials, for example from metal or from a combination of materials. The connector is provided in an embodiment for use in a motor vehicle and for use in charge-air technology or, as an alternative to this, in a cooling system of a motor vehicle. In this connection the handling of the connector is simple and smooth-running so that it is also possible to assemble and disassemble the connection in tight spaces with limited visibility, such as, for example, engine compartments.

In an embodiment, the guide geometry is realized in such a manner that in the circumferential direction at least one, and in an embodiment two, inclined planes are present which are designed in such a manner that they comprise an inclination in or in opposition to a circumferential direction, the inclined planes each being realized ascending outwardly in the radial direction. The guiding of the connecting element by means of the one inclined plane of the guide geometry enables the guide element to move radially. For the case where the guide geometry comprises two inclined planes, the circumferential direction, in which the rotary handle is rotated, is no longer decisive as the connecting element is moved in a radial direction in each direction of rotation by the planes of the guide geometry.

As an alternative to this, it is provided according to one embodiment that the connecting element is connected to the rotating ring in a first circumferential direction by means of the spring geometry and in a second, opposite, circumferential direction by means of a web. A further embodiment provides that the spring geometry comprises a spring element on the left-hand side and a web on the right-hand side. An embodiment provides that the spring geometry comprises a spring element on the left-hand side and on the right-hand side. This is suitable as the radial elasticity is thus increased even more by the arrangement of the spring elements. In particular the arrangement of spring elements on the left-hand and on the right-hand sides provides a clear improvement in the elastic properties of the connection between the spring element and the rotating ring. An alternative design of said embodiment provides that the spring geometry on the left-hand side and on the right-hand side comprises a web. Arranging webs on both sides provides that an inclination of the connecting element in the direction of the second end of the housing as a result of the guide geometry effects a torsion of the webs, as a result of which there is also elasticity of the connecting element in the radial direction. It is provided in an embodiment that the spring geometry comprises a spring element which is realized, in particular, in one piece with the rotating ring and the connecting element.

It is provided in an embodiment that a recess is present on the rotating ring in the radial direction outside the respective web. This is suitable as there is sufficient space for the spring movement of the spring elements as a result of the recess.

It is provided in one embodiment that on the rotating ring in the radially outermost position comprises at least one handle which is aligned substantially in the axial direction. It is provided that the rotating ring comprises a corrugation on a radially outer circumference. The provision of the handle and/or of the corrugation is suitable as safer handling of the unlocking mechanism may be ensured in this way. In addition, the necessary torque for unlocking the connector is thus transmissable in a secure manner to the mechanism.

A further embodiment provides that a circumferential notch is provided on the second end of the housing in the circumferential direction and the rotating ring comprises a molding which engages the notch of the housing. A bearing arrangement of the rotatable rotating ring is provided as a result of said molding. Said bearing arrangement is realized in an embodiment as a sliding bearing between the housing and the rotating ring. In this way, radial forces which can occur when the rotating ring is handled, do not act directly on the locking mechanism, as a result of which, for example, unwanted unlocking is prevented.

A further embodiment provides that the connector comprises a guide ring which is arranged inside the housing between the first end and the rotating ring. In addition, it is expedient that the at least one guide geometry is arranged on the guide ring. This is suitable as the guide ring is able to compensate for possible play of the rotating ring in the axial direction when it is arranged in this manner. By the guide geometry being arranged on the guide ring, a compact design of the connector is possible.

As an alternative to this, it is provided according to an embodiment that the guide ring comprises at least one positioning element which is movable into engagement with at least one groove of the housing. The provision of such a connection, which can be, for example, a tongue and groove connection, provides that the guide ring is arrangeable unambiguously in the housing and at the same time the rotation thereof in the circumferential direction is prevented. In an embodiment, the positioning elements are provided as cuboid moldings which are movable into engagement with corresponding cavities in the inside wall of the housing.

One embodiment provides that a sealing ring is arranged between the housing and the guide ring on an inside surface of the housing, wherein the guide ring is arranged in the axial direction between the sealing ring and the rotating ring which is arranged on the second end of the housing. This is suitable because, in this way, the sealing ring is able to seal the interior of the connector against the surrounding area, the sealing ring being pressed against the guide ring when an internal pressure is raised and sealing the connector there. Such high internal pressures are to be expected, in particular, when the fluids which flow in the fluid lines to be connected absorb a lot of thermal energy. This is the case, for example, with charge-air systems or cooling water circuits. In an embodiment, in this case, the sealing ring is realized as an O-ring seal. As an alternative to this, the sealing ring can also be designed in this connection as a Y-ring seal or an X-ring seal.

It is provided in one embodiment that the rotating ring comprises a slot. It is suitable here that the rotating ring is movable into engagement with a counterpart as a result of the slot. In an embodiment, the counterpart can be realized, in this case, in such a manner that the rotating ring is only movable into engagement with the counterpart in a defined position, when viewed in the circumferential direction. This is suitable as in this way the rotary handle is arranged in a defined manner, for example when a connection is being produced.

In addition, it is provided for a connecting arrangement having a connector according to the disclosure that said connecting arrangement comprises a connecting piece which is insertable into the housing in the axial direction, the connecting piece comprising a securing geometry which is movable into engagement with the at least one connecting element of the connector, wherein the securing geometry comprises in the axial direction, side by side, a first flange and in particular a second flange which extend in the circumferential direction of the connecting piece and are arranged on the outer circumference of the connecting piece. It is suitable for the connecting arrangement that the at least one connecting element is movable into engagement with the securing geometry of the connecting piece. It may be ensured in this way that the connecting piece is not removable from the connector in the axial direction without the connecting elements being unlocked as a result of rotating the rotary handle correspondingly in the circumferential direction.

In addition, an embodiment of the connecting arrangement provides that the first flange comprises a side which is inclined in the direction of the first end of the housing. It is provided according to one embodiment of the connecting arrangement that the first flange and the second flange each comprise a side which is inclined in the direction of the first end of the housing. It is provided in an embodiment for the connecting arrangement that the connecting piece, in the axial direction after the second flange, comprises a third flange which is arranged on the outer circumference of the connecting piece, wherein the third flange comprises a side which is inclined in the direction of the first end of the housing. As a result of said design of the first flange, the connecting piece is able to be mounted in the connector in a simple manner. By the connecting element comprising radial elasticity, the connecting piece is able to be pushed in a simple manner into the connector by way of the inclined side of the first flange without the connector having to be unlocked. In this way, the connecting piece is mountable on the connector in a fully automated manner.

BRIEF DESCRIPTION OF THE FIGURES

Further features, details and advantages of the disclosure proceed from the wording of the claims and from the following description of exemplary embodiments by way of the drawings, in which:

DETAILED DESCRIPTION

Figure 1:
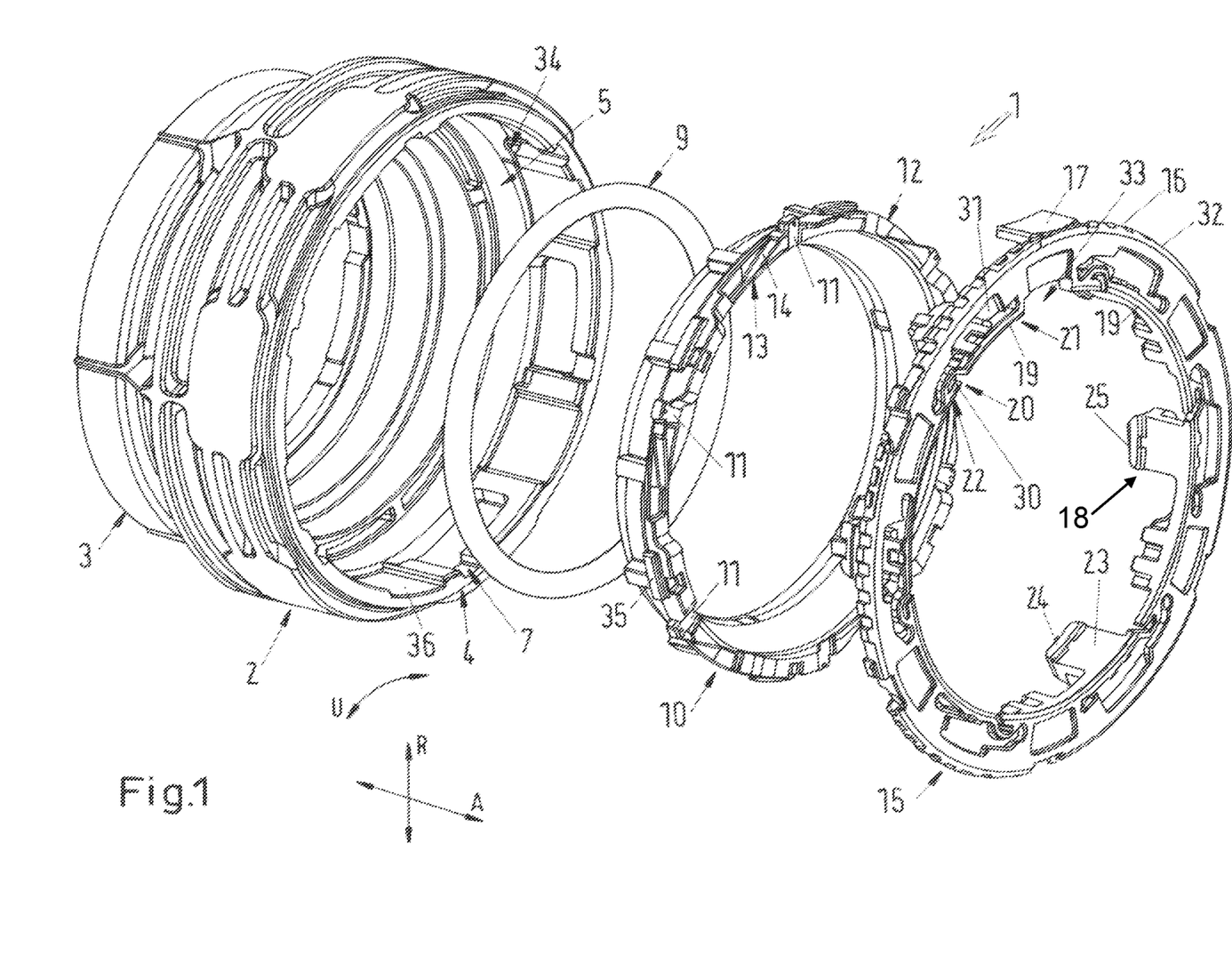
FIG. 1 shows an exploded representation of the connector.

FIG. 1 shows an exploded representation of the connector 1 with a housing 2, the housing 2 being realized as a substantially cylindrical body which comprises a first end 3 and a second end 4 in an axial direction A. The housing 2 is consequently realized as tube and comprises an inside surface 5. A holding geometry 6, which is realized as a groove which extends in the circumferential direction U, is arranged on the inside surface 5 of the housing 2 in the region of the second end 4. In the region of the second end 4, the housing 2 additionally comprises grooves 7 which extend in the axial direction. A slot 8, which runs in the circumferential direction U and extends into the housing 2 in the axial direction A, is arranged on the first end 3 of the housing 2. A sealing ring 9 of the connector 1 is realized as an O-ring seal.

A guide ring 10 comprises positioning elements 11 which are movable into engagement with the grooves 7 of the housing 2. The positioning elements 11 are realized as cuboid moldings and extend in the radial direction R. The grooves 7 of the housing 2 comprise a shaping which corresponds to the positioning elements 11, the positioning elements 11 latching in latching regions 34 of the grooves 7. The positioning elements 11 prevent the guide ring 10 being rotatable in the circumferential direction U. Furthermore, radially extending assignment moldings 35 are mounted on the radially outer surface of the guide ring and are movable into engagement with corresponding assignment moldings 36 of the housing. The guide ring 10 comprises on one end a guide flange 12, in which guide geometries 13 are arranged as slots. Each of the guide geometries 13 comprises an inclined guide surface 14 which merges in the circumferential direction U into substantially planar surfaces.

The connector additionally comprises a rotating ring 15 which is realized substantially as an annular disk. A corrugation 16 and a handle 17, which facilitate the actuation of the rotating ring 15, namely the rotation of the rotating ring 15 in the circumferential direction U, are mounted on the radially outer side of the rotating ring 15. The handle 17 extends in the axial direction A and consequently stands substantially perpendicularly on the annular disk surface of the rotating ring 15. Connecting elements 18, which extend in the axial direction A and are consequently arranged perpendicularly to the annular surface of the rotating ring 15, are arranged on the radially inner side of the rotating ring 15. The connecting elements 18 are arranged on the rotating ring 15 so as to be movable in the radial direction R in relation to the spring geometries 22. The spring geometries comprise webs which rest on the inner circumference of the rotating ring 15, recesses 31, which do not extend beyond the outer circumference of the rotating ring 15, being arranged above the webs 19. The connecting elements 18 are arranged on the elastic spring geometries 22 centred in the circumferential direction U so that the spring geometries 22 comprise left-hand sides 20 and right-hand sides 21. The left-hand sides 20 of the spring geometries 22 are formed by the spring elements 30 in said embodiment, the right-hand sides being formed by webs 19.

The connecting elements 18 are realized in a substantially cuboid manner and are mounted on the spring geometries 22 by means of planar connecting surfaces 23. In addition, on the end remote from the rotating ring 15, the connecting elements 18 comprise a latching geometry 24 which points inwards in the radial direction R with reference to the rotating ring 15. On the side axially remote from the rotating ring 15, the connecting elements 18 comprise a guide molding 25 which is movable into engagement with the guide geometry 13. As a result of the guide geometry 13, when the rotating ring 15 is rotated in the circumferential direction U, the guide molding 25 is moved along the guide geometry 13 so that the connecting element 18 is movable radially outward by the inclined guide surface 14 of the guide geometry 13. The spring elements 30 of the spring geometries 22 additionally enable the connecting element 18 to tilt so that the guide molding 25 is able to be placed against the inclined guide surface 14. In addition, the design of the spring geometries 22 and in particular the spring elements 30 enable a torsion of the spring geometries 22 when the connecting elements 18 are moved along the inclined guide surface 14 in the radial direction R by the guide molding 25, as a result of which the position of the latching geometry 24 is additionally displaced.

Figure 2:
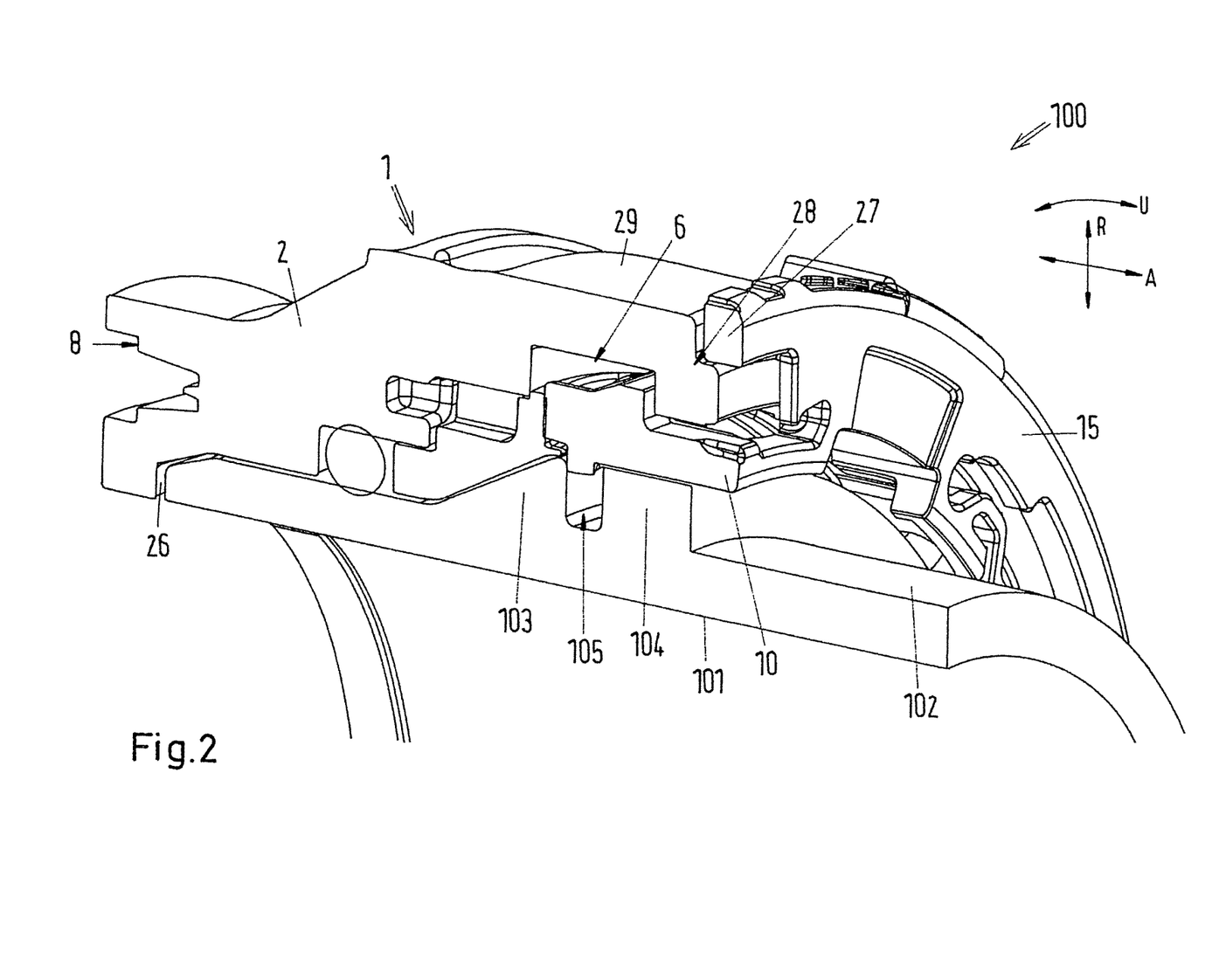
FIG. 2 shows a rotated section of the connecting arrangement with a connecting piece inserted.

FIG. 2 shows the connector 1 as a connecting arrangement 100 with a connecting piece 101. The housing 2 is designed in a step-shaped manner on its inside surface 5, the inside diameter of the housing 2 increasing from the first end 3 toward the second end 4. The connecting piece 101 is substantially a tube which comprises flanges 103, 104 which are spaced apart from one another on its outer circumference 102. The connecting piece 101 is insertable into the housing 2 up to a stop 26 which is formed by a step. The sealing ring 9 is arranged in the second step so that it lies between the housing 2 and the connecting piece 100 in the radial direction R. In the axial direction A, when looking from the sealing ring 9 in the direction of the second end 4 of the housing 2, there is the guide ring 10 and in the opposite direction the housing 2. The guide ring 10 extends in the radial direction R and axial direction A up until the third step of the housing 2 and is molded in such a manner that a first flange 103 of the connecting piece is arrangeable under the guide ring 10. The connecting element 18 of the rotating ring 15 engages the guide geometry 13 of the guide ring 10 via the guide molding 25 of the connection element 18, the latching geometry 24 being positioned in the axial direction A between the first flange 103 and the second flange 104 of the connecting piece 101 in a securing geometry 105. The holding geometry 6 of the housing 2 lies in the radial direction R above the connecting element 18, the connecting element 18 being arranged at least in part in the holding geometry 6. The radial distance between the connecting element 18 and the housing 2 corresponds at least to the radial distance which the connecting element 18 has covered as a result of the guide geometry 13 when the rotating ring 15 rotates in the circumferential direction U. The rotating ring 15 is arranged on the second end of the housing 2 so that the annular disk of the rotating ring 15 lies outside the housing 2 and the connecting surfaces 23 project into the housing 2 in the direction of the first end 3 of the housing 2. The rotating ring 15 additionally comprises a molding 27 which corresponds with a notch 28, the latter lying on the second end 4 of the housing 2 and on the outer lateral surface 29 of the housing 2. The handle 17 of the rotating ring 15 projects in the direction of the first end 3 beyond the outer lateral surface 29 of the housing 2. The rotating ring comprises a slot 33 which is movable into engagement with a counterpart which is not shown. In this connection, the slot 33 and the counterpart are only movable into engagement when the rotating ring 15, rotated in the circumferential direction U, is in a defined position.

FIG. 2 shows a connecting piece 101 with a first flange 103, the side of which lying in the direction of the first side of the housing is inclined. The second flange 104 is realized in cross section in a substantially cuboid manner. The securing geometry 105 is arranged between the first flange 103 and the second flange 104.

When inserting the connecting piece 101 into the housing 2, the latching geometry 24 rests on the inclined side of the first flange 103, as a result of which the connecting element 18 is moved radially outward. This is made possible by the web 19 and the spring geometry 22 of the web. Once the connecting piece 101 is inserted into the housing 2, the connecting element 18 latches 18 in the securing geometry 105 of the connecting piece 101, the latching geometry 24 being surrounded in the axial direction A by perpendicularly extending surfaces of the flanges which form the securing geometry 105 in the axial direction A. Consequently, the arrangement of the connecting piece 101 in the housing 2 is fixed in the axial direction A. The connecting piece 101 can only be removed from the housing 2 by rotating the rotating ring 15 in the circumferential direction U, as a result of which the connecting elements 18 are moved in the radial direction R by means of the guide geometries 13 so that the latching geometries 24 disengage from the securing geometry 105. A further tube, for example, not shown, can be mounted in the slot 8 of the housing 2, which is arranged on the first end 3 thereof, so that the connector 1 connects the further tube and the connecting piece 101.

Figure 3:
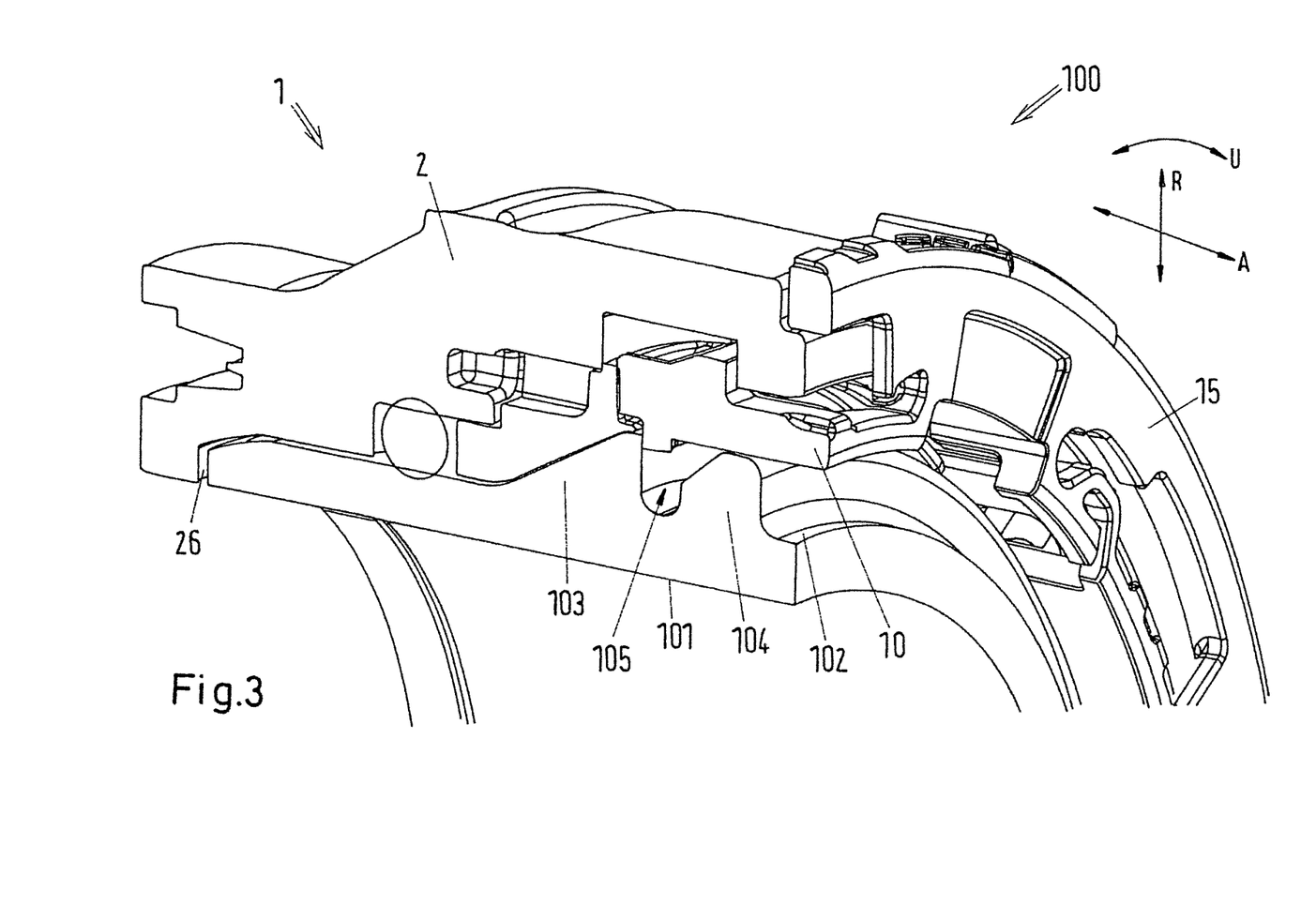
FIG. 3 shows a section of the connecting arrangement with a connecting piece inserted and FIG. 4 shows a further section of the connecting arrangement with a connecting piece inserted.

FIG. 3 shows the connector 1 as a connecting arrangement 100 with a connecting piece 101, which comprises a first flange 103 and a second flange 104, both flanges 103, 104 comprising inclined sides which lie in the direction of the first end 3 of the housing 2. The securing geometry 105 is arranged between the first flange 103 and the second flange 104.

Figure 4:
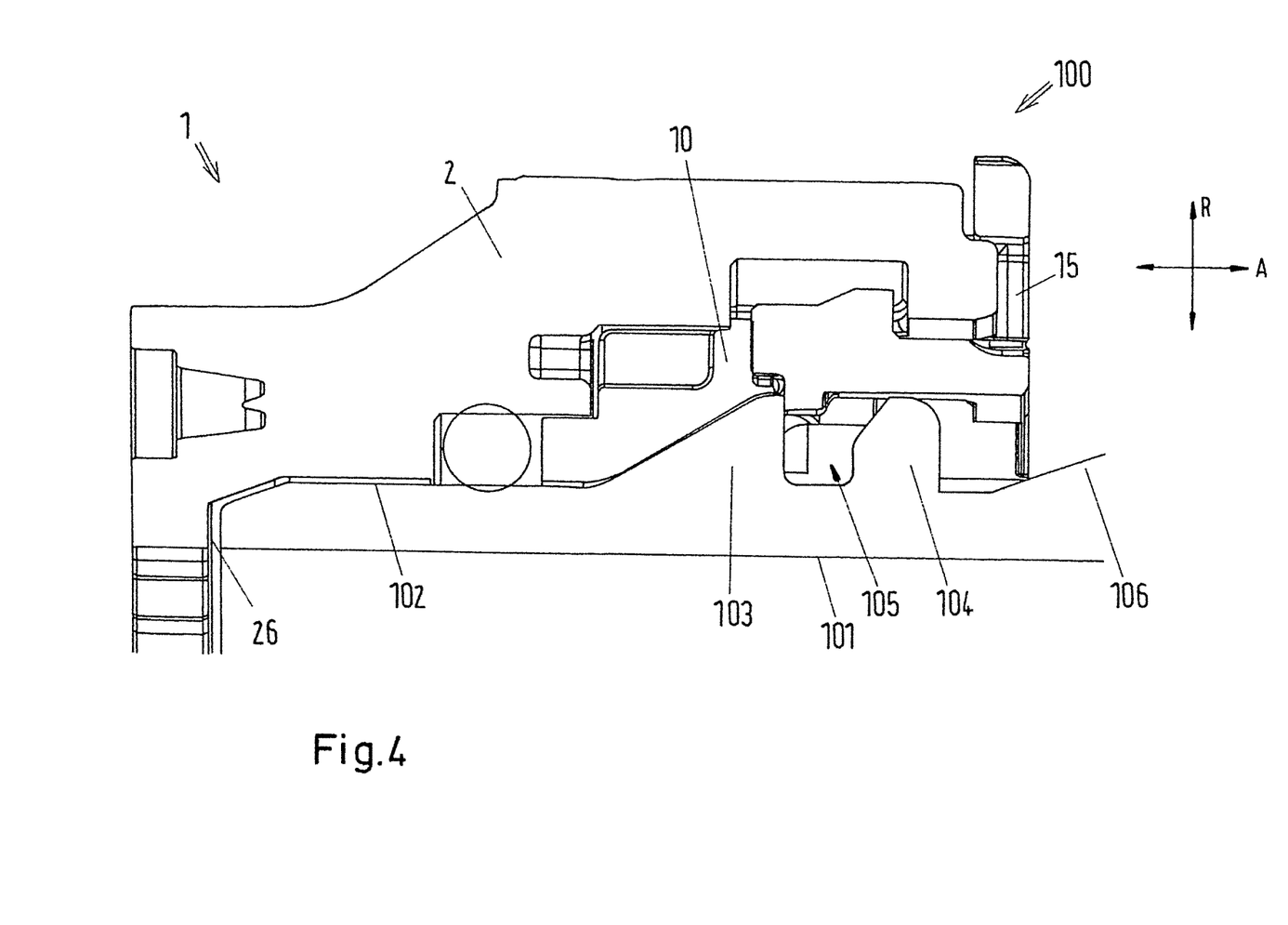

FIG. 4 shows the connector 1 as a connecting arrangement 100 with a connecting piece 101 which has a first flange 103, a second flange 104 and a third flange 106, all flanges 103, 104, 106 comprising inclined sides which lie in the direction of the first end 4 of the housing 2. The third flange 106 lies outside the housing 2. The securing geometry 105 is arranged between the first flange 103 and the second flange 104.

The invention is not limited to one of the afore-described realization forms but is modifiable in diverse ways. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

| List of references | |
|---|---|
| 1. | Connector |
| 2. | Housing |
| 3. | First end |
| 4. | Second end |
| 5. | Inside surface |
| 6. | Holding geometry |
| 7. | Grooves |
| 8. | Slot |
| 9. | Sealing ring |

| List of references -continued | |
|---|---|
| 10. | Guide ring |
| 11. | Positioning elements |
| 12. | Guide flange |
| 13. | Guide geometries |
| 14. | Guide surface |
| 15. | Rotating ring |
| 16. | Corrugation |
| 17. | Handle |
| 18. | Connecting elements |
| 19. | Webs |
| 20. | Left-hand side |
| 21. | Right-hand side |
| 22. | Spring geometry |
| 23. | Connecting surfaces |
| 24. | Latching geometry |
| 25. | Guide molding |
| 26. | Stop |
| 27. | Molding |
| 28. | Notch |
| 29. | Outer lateral surface |
| 30. | Spring element |
| 31. | Recess |
| 32. | Outer circumference |
| 33. | Slot |
| 34. | Latching regions |
| 35. | Assignment moldings |
| 36. | Assignment recesses |
| 100. | Connecting arrangement |
| 101. | Connecting piece |
| 102. | Outer circumference |
| 103. | First flange |
| 104. | Second flange |
| 105. | Securing geometry |
| 106. | Third flange |
| R | Radial direction |
| A | Axial direction |
| U | Circumferential direction |

The invention claimed is:

1. A connector for a fluid seal, comprising a ring-shaped housing, which has a first end and a second end, and a rotating ring, wherein the rotating ring is arranged on the second end and the rotating ring comprises at least one connecting element which engages at least one holding geometry and at least one guide geometry, wherein the at least one connecting element is movable in a radial direction (R) by means of the guide geometry when the rotating ring is rotated relative to the housing, wherein a connecting element is connected to the rotating ring by means of at least one radially elastic spring geometry, and wherein a recess is present on the rotating ring in the radial direction (R) outside a respective web.

2. The connector as claimed in claim 1, wherein the connecting element is connected to the rotating ring in a first circumferential direction (U) by means of the spring geometry and in a second, opposite, circumferential direction by means of a web.

3. The connector as claimed in claim 1, wherein on the rotating ring in the radially outermost position comprises at least one handle which is aligned substantially in an axial direction (A).

4. The connector as claimed in claim 1, wherein the rotating ring comprises a corrugation on a radially outer circumference.

5. The connector as claimed in claim 1, wherein a circumferential notch is provided on the second end of the housing in a circumferential direction (U) and the rotating ring comprises a molding which engages the notch of the housing.

6. The connector as claimed in claim 1, wherein the connector comprises a guide ring which is arranged inside the housing between the first end and the rotating ring.

7. The connector as claimed in claim 6, wherein the at least one guide geometry is arranged on the guide ring.

8. The connector as claimed in claim 7, wherein the guide ring comprises at least one positioning element which is movable into engagement with at least one groove of the housing.

9. The connector as claimed in claim 8, wherein a sealing ring is arranged between the housing and the guide ring on an inside surface of the housing, wherein the guide ring is arranged in an axial direction (A) between the sealing ring and the rotating ring which is arranged on the second end of the housing.

10. A connecting arrangement comprising a connector as claimed in claim 1, wherein said connecting arrangement comprises a connecting piece which is insertable in an axial direction (A) into the housing, wherein the connecting piece comprises a securing geometry which is movable into engagement with the at least one connecting element of the connector, wherein the securing geometry comprises in the axial direction (A) side by side a first flange and a second flange which extend in a circumferential direction (U) of the connecting piece and are arranged on the outer circumference of the connecting piece.

11. The connecting arrangement as claimed in claim 10, wherein the first flange comprises a side which is inclined in the direction of the first end of the housing.

12. The connecting arrangement as claimed in claim 11, wherein the first flange and the second flange each comprise a side which is inclined in the direction of the first end of the housing.

13. The connecting arrangement as claimed in claim 12, wherein the connecting piece, in the axial direction (A) after the second flange, comprises a third flange which is arranged on the outer circumference of the connecting piece, wherein the third flange comprises a side which is inclined in the direction of the first end of the housing.

* * * * *